US011607969B2

(12) United States Patent
Barker et al.

(10) Patent No.: US 11,607,969 B2
(45) Date of Patent: Mar. 21, 2023

(54) ELECTRIFIED VEHICLE CHARGING METHOD AND SYSTEM

(71) Applicant: Ford Global Technologies, LLC, Dearborn, MI (US)

(72) Inventors: Jonathan Barker, Detroit, MI (US); Kevin Mackenzie, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 56 days.

(21) Appl. No.: 16/952,696

(22) Filed: Nov. 19, 2020

(65) Prior Publication Data
US 2022/0153158 A1 May 19, 2022

(51) Int. Cl.
H02J 7/00 (2006.01)
H02J 7/14 (2006.01)
B60L 53/50 (2019.01)
B60L 50/64 (2019.01)
B60L 53/18 (2019.01)
B60L 53/62 (2019.01)
B60L 53/16 (2019.01)

(52) U.S. Cl.
CPC ............... *B60L 53/50* (2019.02); *B60L 50/64* (2019.02); *B60L 53/16* (2019.02); *B60L 53/18* (2019.02); *B60L 53/62* (2019.02)

(58) Field of Classification Search
CPC .......... B60L 53/50; B60L 53/62; B60L 53/16; B60L 53/18; B60L 50/64; B60L 55/00
USPC ........................................................ 320/134
See application file for complete search history.

(56) References Cited

U.S. PATENT DOCUMENTS

| 9,379,559 | B2 | 6/2016 | O'Connell et al. |
| 11,007,891 | B1* | 5/2021 | Kamal ................. B60L 53/67 |
| 11,264,825 | B1* | 3/2022 | Harris ................. B60L 53/14 |
| 2015/0069970 | A1* | 3/2015 | Sarkar ................. B60L 53/64 320/109 |
| 2017/0334296 | A1* | 11/2017 | Martin ................. H02J 7/04 |
| 2020/0062138 | A1* | 2/2020 | Smolenaers ............ B60L 53/24 |
| 2020/0282855 | A1* | 9/2020 | Slutzky ................ B60L 58/16 |
| 2021/0061125 | A1* | 3/2021 | Nasr .................... H02M 1/126 |
| 2021/0155100 | A1* | 5/2021 | Khaligh ................ B60L 55/00 |
| 2021/0394634 | A1* | 12/2021 | Lu ....................... B60L 53/62 |
| 2022/0024494 | A1* | 1/2022 | Bonanni ............... B60W 50/06 |

FOREIGN PATENT DOCUMENTS

| FR | 2978303 | 1/2013 |
| WO | 2019046939 | 3/2019 |

* cited by examiner

*Primary Examiner* — Alexis B Pacheco
(74) *Attorney, Agent, or Firm* — David B. Kelley; Carlson, Gaskey & Olds, P.C.

(57) ABSTRACT

A vehicle charging method includes, among other things, electrically connecting a first vehicle to a grid source, electrically connecting the first vehicle to a second vehicle, and charging a traction battery of the first vehicle using electricity from the second vehicle and electricity from the grid source. A vehicle charging system includes, among other things, a traction battery of a first vehicle, and a charger that is used to charge the traction battery using electricity from a grid source, electricity from a second vehicle, or both.

20 Claims, 3 Drawing Sheets

ELECTRIFIED VEHICLE CHARGING METHOD AND SYSTEM

TECHNICAL FIELD

This disclosure relates generally to charging a traction battery of an electrified vehicle using an output from another vehicle and an output from a grid source.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), and battery electric vehicles (BEVs).

SUMMARY

A vehicle charging method according to an exemplary aspect of the present disclosure includes, among other things, electrically connecting a first vehicle to a grid source, electrically connecting the first vehicle to a second vehicle, and charging a traction battery of the first vehicle using electricity from the second vehicle and electricity from the grid source.

In another example of the foregoing method, a traction battery of the second vehicle provides the electricity from the second vehicle.

Another example of any of the foregoing methods includes combining electricity from the second vehicle and the grid source at a charger to provide a source of combined electricity and, during the charging, providing the combined electricity to the first vehicle.

Another example of any of the foregoing methods includes, at the charger, synchronizing electricity from the second vehicle with electricity from the grid source during the combining.

In another example of any of the foregoing methods, the synchronizing comprising synchronizing a frequency of electricity from the second vehicle with a frequency of electricity from the grid source.

Another example of any of the foregoing methods includes, at a charger, combining current from the second vehicle with current from the grid source to provide a combined current that is used to charge the traction battery of the first vehicle.

Another example of any of the foregoing methods includes connecting a charger to a charge port of the first vehicle and to a charge port of the second vehicle to electrically connect the first vehicle to the second vehicle.

Another example of any of the foregoing methods includes connecting a charger to a charge port of the first vehicle and to a wall outlet to electrically connect the first vehicle to the grid source.

Another example of any of the foregoing methods includes communicating signals between the first vehicle, the second vehicle, and the wall outlet over low voltage lines.

Another example of any of the foregoing methods includes during the charging, using more electricity from the grid source to charge the traction battery of the first vehicle than electricity from the second vehicle.

Another example of any of the foregoing methods includes prioritizing a using of electricity from the grid source for charging ahead of a using of electricity from the second vehicle.

A vehicle charging system according to an exemplary aspect of the present disclosure includes, among other things, a traction battery of a first vehicle, and a charger that is used to charge the traction battery using electricity from a grid source, electricity from a second vehicle, or both.

Another example of the foregoing system includes a traction battery of the second vehicle. The charger uses electricity from the traction battery of the second vehicle to charge the traction battery of the first vehicle.

In another example of any of the foregoing systems, the charger is configured to combine electricity from grid source and the charger to provide combined electricity for charging the first vehicle.

In another example of any of the foregoing systems, the charger is configured to synchronize electricity from the second vehicle with electricity from the grid source when combining electricity from grid source and the charger.

In another example of any of the foregoing systems, the charger includes a first charge plug that electrically connects the charger to the first vehicle, a second charge plug that electrically connects the charger to the second vehicle, and a wall plug that electrically connects the charger to the grid source.

In another example of any of the foregoing systems, the charger is configured to prioritize a using of electricity from the grid source for charging ahead of a using of electricity from the second vehicle.

In another example of any of the foregoing systems, the charger is outside and separate from the first vehicle.

In another example of any of the foregoing systems, the first vehicle includes the charger.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details exemplary methods and systems for charging a traction battery of an electrified vehicle.

The charging draws from a grid source and a traction battery of a source vehicle. A charger combines current from the grid source with current from the source vehicle. The charger then provides the combined current to the electrified vehicle to charge the traction battery.

Figure 1:
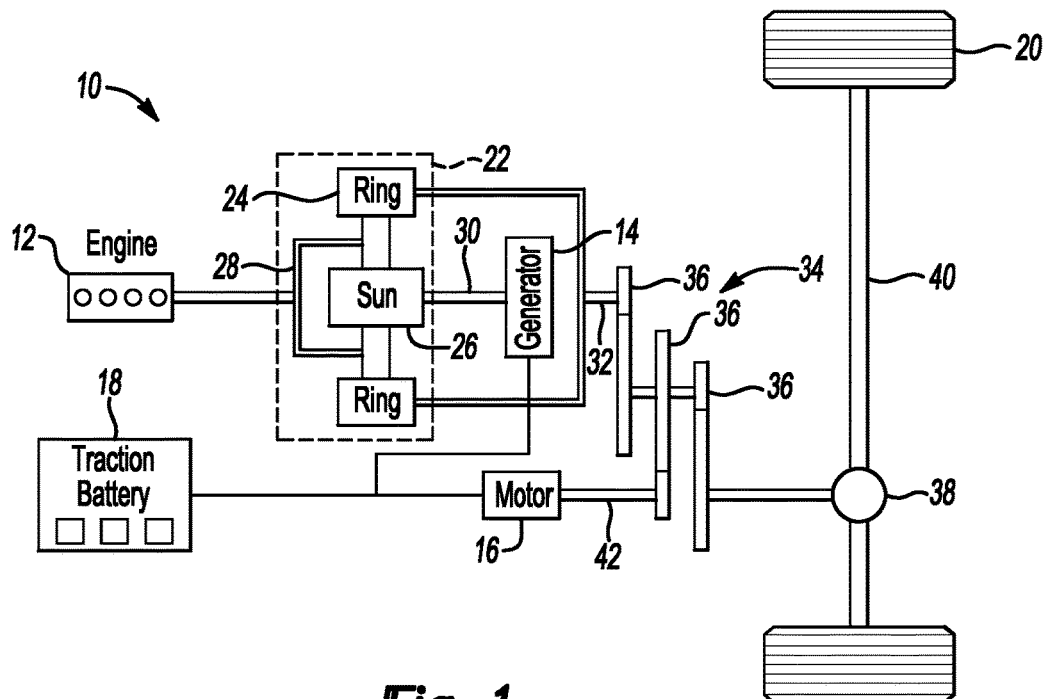
FIG. 1 illustrates a schematic view of a powertrain for an electrified vehicle.

FIG. 1 schematically illustrates selected portions of a powertrain 10 of an electrified vehicle. Although depicted as a hybrid electrified vehicle (HEV), it should be understood that the concepts described herein are not limited to HEVs and could extend to other electrified vehicles, including, but not limited to, plug-in hybrid electrified vehicles (PHEVs), fuel cell vehicles (FCVs), and battery electrified vehicles (BEVs).

In an embodiment, the powertrain 10 is a powersplit powertrain system that employs a first drive system and a second drive system. The first drive system includes a combination of an engine 12 and a generator 14 (i.e., a first electric machine). The second drive system includes at least a motor 16 (i.e., a second electric machine), the generator 14, and at least one traction battery 18. In this example, the second drive system is considered an electric drive system of the powertrain 10. The first and second drive systems generate torque to drive one or more sets of vehicle drive wheels 20 of the electrified vehicle.

The engine 12, which is an internal combustion engine in this example, and the generator 14 may be connected through a power transfer unit 22. In one non-limiting embodiment, the power transfer unit 22 is a planetary gear set that includes a ring gear 24, a sun gear 26, and a carrier assembly 28. Of course, other types of power transfer units, including other gear sets and transmissions, may be used to connect the engine 12 to the generator 14.

The generator 14 can be driven by engine 12 through the power transfer unit 22 to convert kinetic energy to electrical energy. The generator 14 can alternatively function as a motor to convert electrical energy into kinetic energy, thereby outputting torque to a shaft 30 connected to the power transfer unit 22. Because the generator 14 is operatively connected to the engine 12, the speed of the engine 12 can be controlled by the generator 14.

The ring gear 24 of the power transfer unit 22 may be connected to a shaft 32, which is connected to vehicle drive wheels 20 through a second power transfer unit 34. The second power transfer unit 34 may include a gear set having a plurality of gears 36. Other power transfer units may also be suitable. The gears 36 transfer torque from the engine 12 to a differential 38 to ultimately provide traction to the vehicle drive wheels 20. The differential 38 may include a plurality of gears that enable the transfer of torque to the vehicle drive wheels 20. In this example, the second power transfer unit 34 is mechanically coupled to an axle 40 through the differential 38 to distribute torque to the vehicle drive wheels 20.

The motor 16 (i.e., the second electric machine) can also be employed to drive the vehicle drive wheels 20 by outputting torque to a shaft 42 that is also connected to the second power transfer unit 34. In one embodiment, the motor 16 and the generator 14 cooperate as part of a regenerative braking system in which both the motor 16 and the generator 14 can be employed as motors to output torque. For example, the motor 16 and the generator 14 can each output electrical power to the traction battery 18.

The traction battery 18 has the form of a high-voltage battery that is capable of outputting electrical power to operate the motor 16 and the generator 14. The traction battery 18 is a traction battery as it provides power to drive the vehicle drive wheels 20.

In the exemplary embodiment, the traction battery 18 is a battery pack that includes a plurality of battery arrays 44 or battery modules. Each of the battery arrays 44 includes a plurality of individual battery cells.

Figure 2:
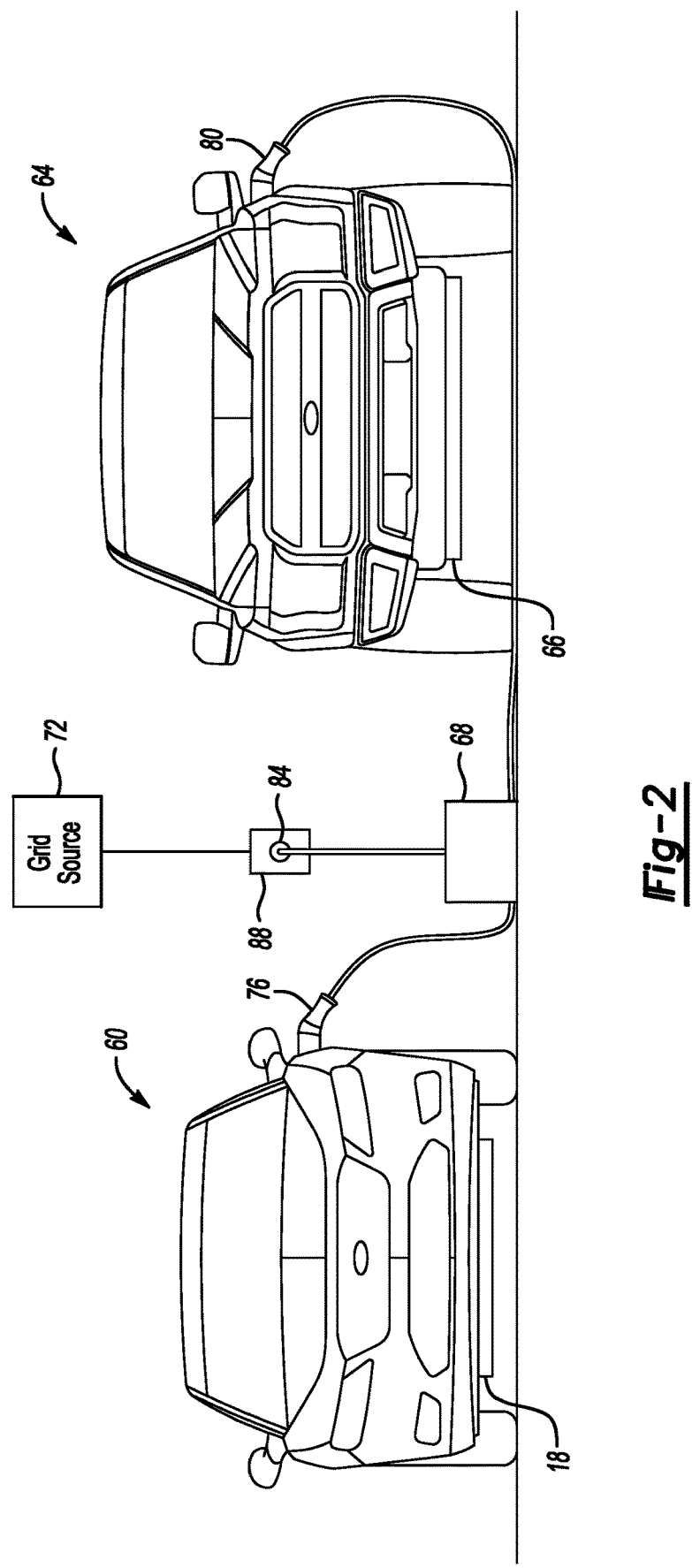
FIG. 2 illustrates a vehicle having the powertrain of FIG. 1 along with another electrified vehicle and a charger according to an exemplary aspect of the present disclosure.

Referring now to FIG. 2 with continuing reference to FIG. 1, an electrified vehicle 60 includes the powertrain 10 of FIG. 1. The electrified vehicle 60 is within a garage, for example, and parked next to another electrified vehicle 64. The electrified vehicle 60 is a first vehicle. The electrified vehicle 64, a pickup truck in this example, is a second vehicle. The electrified vehicle 64 includes a traction battery 66.

A charger 68 is electrically connected to the vehicle 60, the vehicle 64, and a grid source 72. In the example, the charger 68 is electrically connected to the vehicle 60 through a charge plug 76. The charger 68 is electrically connected to the vehicle 64 through a charge plug 80. The charger 68 is electrically connected to the grid source 72 through a wall plug 84.

In this example, the charger 68 is separate from the vehicle 60 and is outside the vehicle 60. In another example, the vehicle 60 includes the charger 68. That is, the charger 68 could be part of the vehicle 60.

The charge plug 76 engages a charge port of the vehicle 60 when the charger 68 is electrically connected to the vehicle 60. The charge plug 80 engages a charge port of the vehicle 64 when the charger 68 is electrically connected to the vehicle 64. The wall plug 84 is electrically connected to a wall outlet 88 when the charger 68 is electrically connected to the grid source 72.

The charge plug 80 is a bidirectional charge plug, which, for purposes of this disclosure, means that the charger 68 can receive electricity passed through the charge plug 80 from the traction battery 66 of the vehicle 64, or that the charger 68 can send electricity through the charge plug 80 to the traction battery 66 of the vehicle 64. The charge plug 76 is also a bidirectional charger in the exemplary embodiment.

The charger 68 can selectively charge the traction battery 18 of the vehicle 60 using electricity from the grid source 72 or electricity from the traction battery 66 of the vehicle 64. The charger 68 can instead charge the traction battery 18 of the vehicle 60 using both electricity provided from a traction battery 66 of the vehicle 64, and electricity from the grid source 72. Relying on the vehicle 64 and the grid source 72 can help increase the speed at which the traction battery 18 of the vehicle 60 is brought to a desired state of charge.

The wall outlet 88 is electrically connected to the grid source 72. The wall outlet 88 can be considered part of a Level 1 charging station that is commonly available within residential homes. Charging the traction battery 18 of the vehicle 60 from the Level 1 charging station utilizing electricity provided by the grid source 72 can take, in some examples, more than 24 hours.

The charger 68 and vehicle 64 can reduce this charging time. The charger 68 can, for example, combine the electricity from the vehicle 64 and the grid source 72. The charger 68 then provides the combined electricity to the vehicle 60 to charge the traction battery 18. The charger 68 supplements the electricity from the grid source 72 with additional electricity from the vehicle 64 to reduce a time required to increase a state of charge of the charging the traction battery 18 of the vehicle 60 to a desired level.

The combining of electricity from the vehicle 64 and the grid source 72 provides a source of combined electricity for charging the traction battery 18. In this example, the charger 68 combines a current of the electricity from the vehicle 64 with a current of electricity from the grid source 72 to provide a combined current. The traction battery 18 of the vehicle 60 is then charged using the combined current.

In this example, the charger 68 prioritizes using electricity from the grid source 72 for the charging ahead of using of electricity from the vehicle 64 for the charging. If, for example, the grid source 72 can provide 40 amps to the charger 68, but the vehicle 60 can receive up to 70 amps, the charger 68 utilizes the 40 amps from the grid source 72 and combines this with 30 amps from the vehicle 64. That is, the charger 68 utilizes electricity provided by the grid source 72 and supplements with electricity from the vehicle 64.

The charger 68 can synchronize electricity provided by the traction battery 66 of the vehicle 64 with electricity provided by the grid source 72. Synchronizing can involve, among other things, synchronizing a frequency of electricity from the vehicle 64 with the frequency of electricity from the grid source 72. Synchronization can involve matching other electrical parameters, such a phase and voltage.

Synchronization within the charger 68 can be accomplished in many ways. In some examples, the synchronization occurs via the opening of switches, the closing of switches, or both. The switches can be insulated-gate bipolar transistors (IGBTs) in some examples. The control module of the charger 68 could include a microcontroller that is used to control transitions of the IGBTs.

Figure 3:
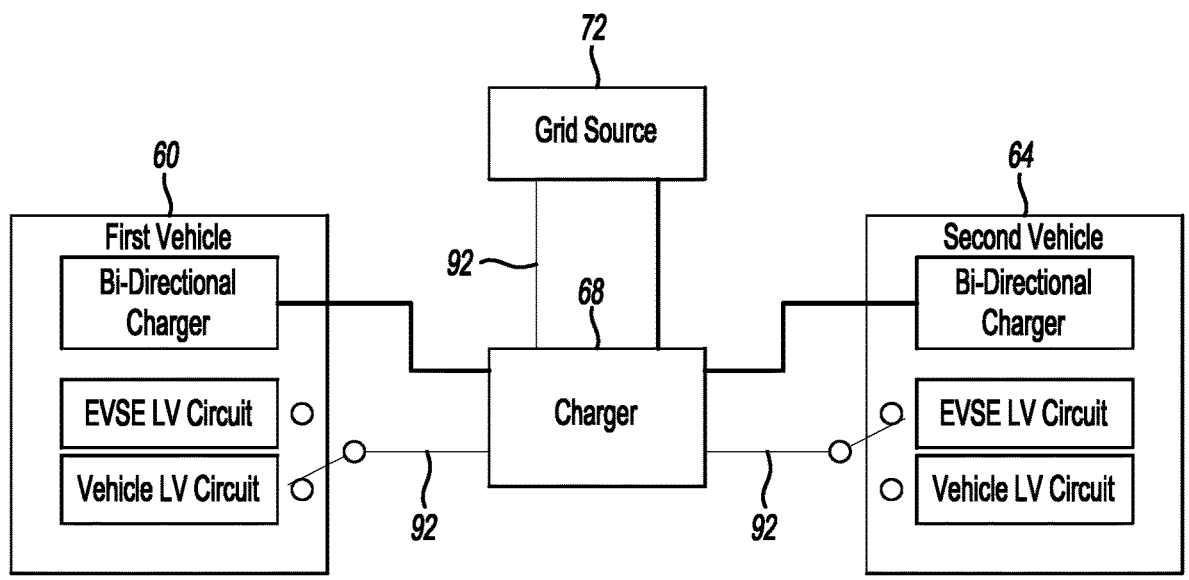
FIG. 3 illustrates a schematic view of the vehicles and charger of FIG. 2.

With reference now to the highly schematic view of FIG. 3, the charger 68 can include low voltage communication lines 92 that are utilized to communicate with the first vehicle 60, the second vehicle 64, and the grid source 72. Low voltage communication lines can communicate signals to the charger 68 indicating, for example, a rate at which the traction battery 18 of the first vehicle 60 can be charged. Communications from this second vehicle 64 and 72 can communicate signals to the charger 68 indicating how much electricity the traction battery 66 of the vehicle 64 and the grid source can each provide for charging the traction battery 18 in the first vehicle 60. The charger 68 can process this information and the provide an appropriate combined current to the first vehicle 60.

The exemplary charger 68 has a wired connection to the vehicle 60, the vehicle 64, and the grid source 72. In other examples, the charger 68 could wirelessly connect to the vehicle 60, the vehicle 64, the grid source 72. For example, the charger 68 could charge the traction battery 18 of the vehicle 60 using an inductive charging process.

The charger 68 can include parts of a control module that helps to, among other things, control the combining, the receiving, and the delivery of electricity. The control module can include, for example, a processor operatively linked to a memory portion. The processor is programmed to execute a program stored in the memory portion. The program may be stored in the memory portion as software code. The program stored in the memory portion may include one or more additional or separate programs, each of which includes an ordered list of executable instructions for implementing logical functions.

The processor can be a custom made or commercially available processor, a central processing unit (CPU), an auxiliary processor among several processors associated with the control module, a semiconductor-based microprocessor (in the form of a microchip or chip set) or generally any device for executing software instructions. The memory portion can include any one or combination of volatile memory elements and/or nonvolatile memory elements.

Figure 4:
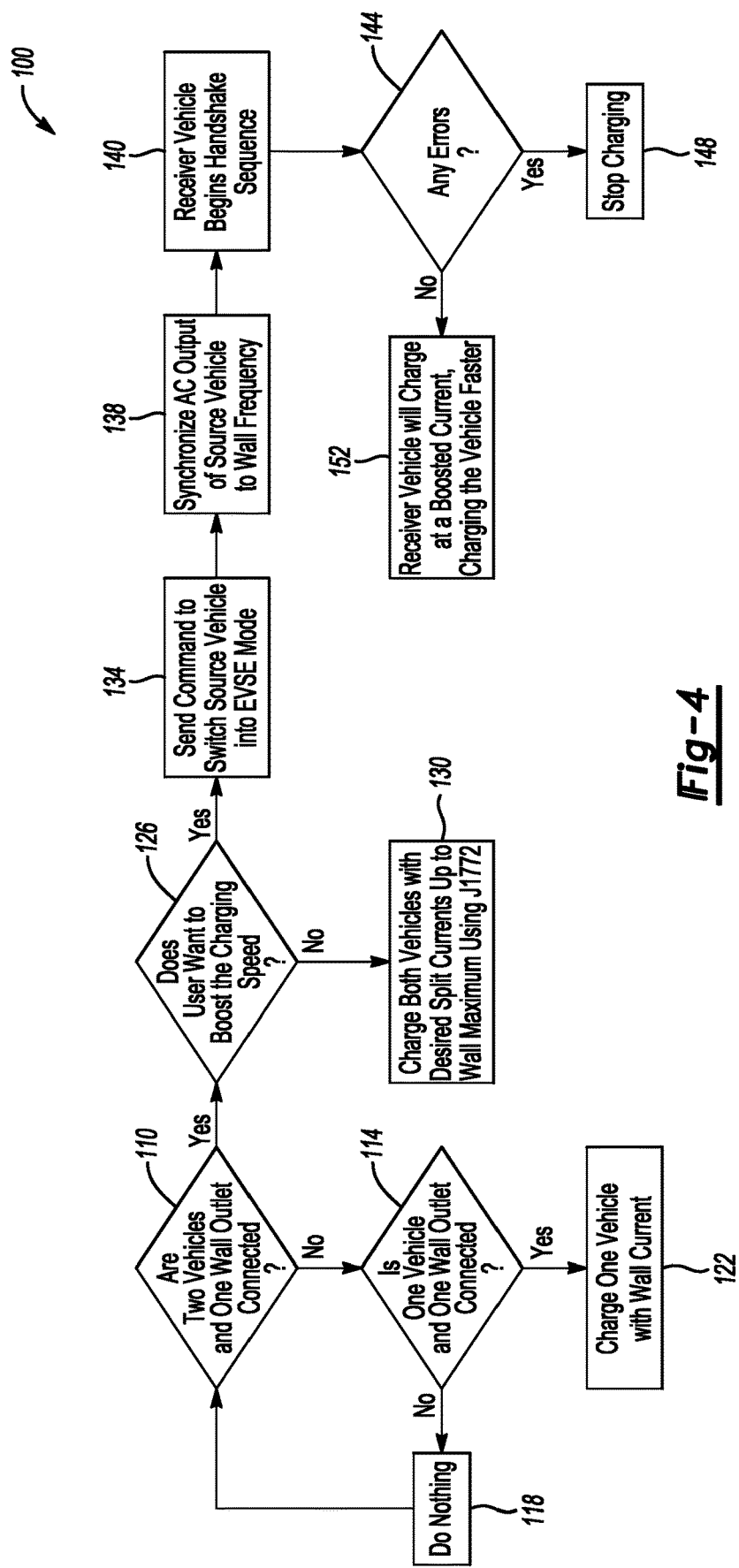
FIG. 4 illustrates a flow of a method of controlling the charger of FIGS. 1 and 2 according to another exemplary aspect of the present disclosure.

A flow of exemplary control method 100 associated with control module of the charger 68 is outlined in FIG. 4. A step 110 first assesses whether or not the charger 68 is connected to two vehicles and one wall outlet. If no, the method 100 moves to a step 114, which assesses whether one vehicle and one wall outlet are connected to the charger 68. If not, the method 100 moves to a step 118 and then returns to the step 110.

If, at the step 110, two vehicles and a wall outlet are connected to the charger 68, the method 100 moves to a step 126, which assesses whether or not a user wants to boost a speed for charging one of the vehicles. The assessment of whether or not the user wants to boost the charging speed at the step 126 may be based on prior selections made by the user or may be the response of an input signal initiated by the user and communicated to the charger 68.

If the user does not want to boost the charging speed at the step 126, the flow moves to the step 130 where both vehicles are charged with desired split currents up to a maximum capable of being provided by the wall outlet using, for example, a J1772 standard.

If, at the step 126, the user does want to boost the charging speed, the flow moves to the step 134. At the step 134, a command is sent from the charger 68 to the other vehicle that will be used as a source for electricity. The command switches the vehicle that will be used as a source into an EVSE mode.

From the step 134, the method 100 moves to a step 138, which synchronizes an alternating current (AC) output of electricity from the source vehicle to a frequency of the electricity provided from the grid source 72.

The method 100 then moves to a step 140 where the vehicle to be charged begins a handshake sequence to ensure that, among other things, the vehicle can be charged.

At a step 144, the method 100 assesses if there were errors during the handshake sequence. If yes, the method 100 moves to a step 148 which stops the charging procedure. If no, the method 100 moves to the step 152 where the charger 68 provides the combined current, which includes electricity from one of the vehicles and the grid source, to the vehicle the user desires to charge faster.

Features of the disclosed examples allow a user to charge a traction battery of a vehicle more quickly than if they were relying exclusively on a grid source of power to charge the traction battery. In the above examples, charging the first vehicle 60 more quickly is desired as the user desires to utilize vehicle 60 for a long road trip prior to any usage of the vehicle 64. After the vehicle 60 is charged to a desired level, the vehicle can be driven and the charger 68 used to directly charge the vehicle 64 utilizing the grid source 72 of electricity.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle charging method, comprising:
   electrically connecting a first vehicle to a grid source;
   electrically connecting the first vehicle to a second vehicle; and
   charging a traction battery of the first vehicle using electricity from the second vehicle and electricity from the grid source; and
   combining electricity from the second vehicle and the grid source at a charger to provide a source of combined electricity and, during the charging, providing the combined electricity to the first vehicle.

2. The vehicle charging method of claim 1, wherein a traction battery of the second vehicle provides the electricity from the second vehicle.

3. The vehicle charging method of claim 1, further comprising, at the charger, synchronizing electricity from the second vehicle with electricity from the grid source during the combining.

4. The vehicle charging method of claim 3, wherein the synchronizing comprises synchronizing a frequency of electricity from the second vehicle with a frequency of electricity from the grid source.

5. A vehicle charging method, comprising:
electrically connecting a first vehicle to a grid source;
electrically connecting the first vehicle to a second vehicle; and
charging a traction battery of the first vehicle using electricity from the second vehicle and electricity from the grid source
at a position outside the first vehicle and the second vehicle, combining current from the second vehicle with current from the grid source to provide a combined current that is used to charge the traction battery of the first vehicle.

6. The vehicle charging method of claim 1, further comprising connecting the charger to a charge port of the first vehicle and to a charge port of the second vehicle to electrically connect the first vehicle to the second vehicle.

7. The vehicle charging method of claim 1, further comprising connecting the charger to a charge port of the first vehicle and to a wall outlet to electrically connect the first vehicle to the grid source.

8. The vehicle charging method of claim 7, further comprising communicating signals between the first vehicle, the second vehicle, and the wall outlet over low voltage lines of the charger.

9. The vehicle charging method of claim 1, further comprising, during the charging, using more electricity from the grid source to charge the traction battery of the first vehicle than electricity from the second vehicle.

10. The vehicle charging method of claim 1, further comprising prioritizing a using of electricity from the grid source for charging ahead of a using of electricity from the second vehicle.

11. A vehicle charging system, comprising:
a traction battery of a first vehicle; and
a charger that is used to charge the traction battery using electricity from a grid source, electricity from a second vehicle, or both, wherein the charger is configured to combine electricity from grid source and the second vehicle to provide combined electricity for charging the first vehicle.

12. The vehicle charging system of claim 11, further comprising a traction battery of the second vehicle, the charger using electricity from the traction battery of the second vehicle to charge the traction battery of the first vehicle.

13. The vehicle charging system of claim 12, wherein the charger is configured to synchronize electricity from the second vehicle with electricity from the grid source when combining electricity from grid source and the charger.

14. The vehicle charging system of claim 11, wherein the charger includes a first charge plug that electrically connects the charger to the first vehicle, a second charge plug that electrically connects the charger to the second vehicle, and a wall plug that electrically connects the charger to the grid source.

15. The vehicle charging system of claim 11, wherein the charger is configured to prioritize a using of electricity from the grid source for charging ahead of a using of electricity from the second vehicle.

16. The vehicle charging system of claim 11, wherein the charger is outside and separate from the first vehicle.

17. The vehicle charging system of claim 11, wherein the first vehicle includes the charger.

18. The vehicle charging method of claim 1, wherein the charger is outside the first vehicle and outside the second vehicle.

19. The vehicle charging system of claim 11, wherein the charger is separate from the first vehicle and the second vehicle.

20. The vehicle charging method of claim 1, further comprising
at the charger, synchronizing electricity from the second vehicle with electricity from the grid source during the combining; and
prioritizing a using of electricity from the grid source for charging ahead of a using of electricity from the second vehicle,
wherein the charger is a bidirectional charger.

* * * * *